Figure 1:
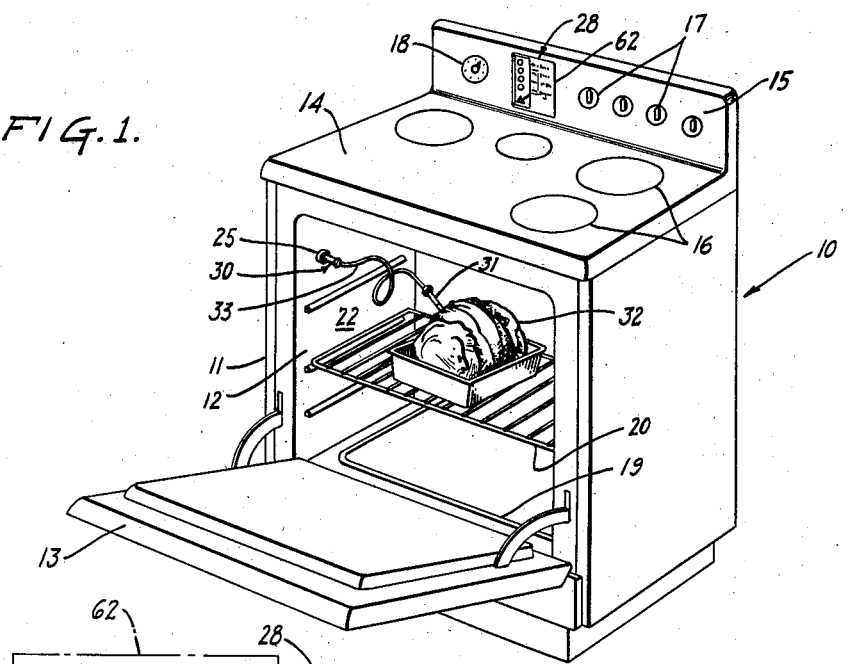

Nov. 4, 1958 D. W. SCOFIELD ET AL 2,858,699
COOKING TEMPERATURE MEASURING APPARATUS
Filed May 9, 1955

INVENTORS
DONALD W. SCOFIELD
EDWIN C. GULICK
BY
Carl H. Synnestvedt

AGENT

2,858,699

COOKING TEMPERATURE MEASURING APPARATUS

Donald W. Scofield, Glenside, and Edwin C. Gulick, Hatboro, Pa., assignors to Philco Corporation, Philadelphia, Pa., a corporation of Pennsylvania Application May 9, 1955, Serial No. 506,922

6 Claims. (Cl. 73—352)

This invention hereinafter described and claimed relates to cooking stoves or ranges of the type including an oven. More particularly, the invention has to do with a cooking indicator system arranged in novel combination with range structure in such manner as conveniently and accurately to indicate on the range, exteriorly of the oven, the condition of food being cooked.

Range manufacturers and users for many years have been unsuccessful in their search for practical apparatus to assist cooks in determining the condition of food being cooked in ovens, without resort to such inaccurate and inconvenient methods as opening the door and jabbing the meat with a fork or some other sharp instrument. Expert cooks, of course, by the weight and configuration of a given piece of meat, such as a roast, can estimate the necessary cooking time. At best, however, this is only an approximation easily upset by an occasional opening of the oven door to observe the condition of the meat as it cooks. Then, too, few range users qualify as expert cooks.

It is realized that oven thermometers are available, but generally these are of the type in which the indicator forms a part of the probe inserted into the meat and therefore is within the oven during the cooking, necessitating opening of the oven door to read the indicator. This is inconvenient, as well as inefficient, as it upsets the heat balance of the oven.

It is apparent from the above that there is a real need for a range including practical means overcoming these difficulties, and it is the primary object of the present invention to provide a range and cooking-indicator combination, making it extremely easy for even the most inexperienced cook to determine when the food in the oven has reached the desired cooked condition.

More specifically, an object of the invention is to provide cooking indicator means on the control panel of a range, whereby the progress of food being cooked within the oven may be determined at a glance.

My invention also has an object the provision of indicating means which is adapted for energization from the usual household alternating current supply.

It is also an object of the invention to provide such apparatus, characterized by unusual simplicity, both structurally and operationally, ruggedness of construction, and the ease with which it may be cleaned.

While the apparatus is useful for indicating the cooked condition of various types of food, it is primarily useful in the roasting of meat, and the following description is therefore directed to such use.

To these general ends, and first briefly described, the invention provides, in combination, a cooking range and a cooking indicator system. The range includes an oven and an exterior control panel, while the system provides exterior indicating means, preferably a dial indicator mounted upon the control panel, and a pointed temperature-responsive probe adapted for insertion in the meat to be cooked in the oven.

The tip of the probe houses an element, such as a thermistor, having a negative temperature coefficient of resistance, being characterized by low resistance when hot and high resistance when cold. The probe is arranged to effect actuation of the indicator needle or pointer through suitable circuitry including a voltage regulator and a transformer. When the tip of the probe—and therefore the thermistor—is surrounded by cold meat, the current through the circuit is insufficient to move the indicator pointer and it remains at the cold or zero end of its dial. As the temperature of the meat increases, the resistance of the thermistor gradually lowers permitting current to flow through the circuit in amount sufficient to cause movement of the pointer across the face of the dial, in this manner indicating the progress of the meat as it cooks, ranging—on the temperature scale—from rare to well done beef, and onward to lamb, fresh pork, etc.

Figure 2:
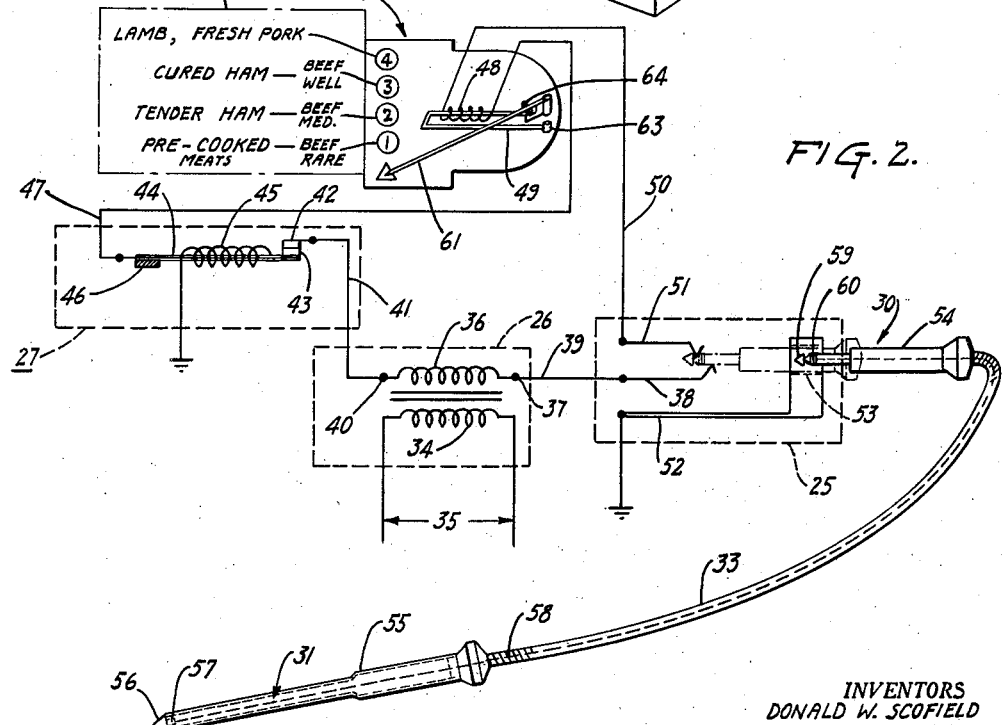

The foregoing objects, advantages and features of the invention will be fully understood from a consideration of the drawing, in which:

Figure 1 is a perspective view of a domestic electric range incorporating the apparatus of the invention; and Figure 2 is a diagrammatic view of the cooking indicator system.

More specifically, and with particular reference to Figure 1, the numeral 10 designates an electric cooking range comprising a body 11 enclosing an open front oven 12, provided with a door 13, and including a top cooking surface 14 having a control panel or splash guard 15 along its back edge. As is customary, cooking surface 14 is provided with the usual surface burners 16 having their controls 17, together with the control 18 for the oven heating element 19, mounted on panel 15. The oven is also provided with a shelf 20 for supporting items to be cooked.

In particular accordance with the present invention, there is provided in one side wall 22 of the oven, adjacent the front opening thereof, a jack or receptacle 25 connected in circuit with a transformer 26 and with a "voltage regulator" of known type, shown at 27 in Figure 2. Such devices, per se, are not new and serve as voltage-responsive current regulating means. The jack is also in circuit with the indicator 28, mounted on the control panel. The probe assembly includes the plug 30 cooperable with jack 25, and a pointed probe 31, shown (in Figure 1) as inserted in a roast 32, the plug and probe being connected by a flexible cable 33.

More specifically, and as seen in Figure 2, primary winding 34 of the transformer is connected to an alternating current source of input voltage, at 35. Conveniently, this may be the source commonly used for household or domestic purposes, ranging from about 105–125 volts, at 60 cycles. This voltage is reduced in the secondary winding 36 to 9.5–12 volts to energize the system at low voltage. The use of low voltage in the system is doubly desirable as it permits the use of minimum insulation; also, as the probe is a portable device handled by the user, low voltage adds to the safety of the apparatus.

One side of secondary winding 36 is connected to the flexible jack contact 38 as by conductor 39, while the other side 40 is connected by conductor 41 to fixed contact 42 of the normally closed switch of the voltage regulator 27. The other contact element 43 of the voltage regulator is carried by a bimetal strip 44 which has a heater coil 45 wrapped thereabout. The bimetal strip is fixed as at 46 and is connected through conductor 47 to one end of a heater coil 48 wrapped around one leg of a U-shaped bimetal element 49, supplying the motive force of the indicator. The other end of heater coil 48 is connected by conductor 50 to a second jack contact 51.

It will be observed that one end of heater coil 45, of the voltage regulator, is connected to bimetal strip 44 while its other end is connected through ground to plug support 52 of the jack. Although switch contacts 42 and 43 of the voltage regulator are normally closed, an important feature of the apparatus is that the circuit, including heater 45, remains open—at the jack—and thus is not energized until plug 30 of the probe assembly is inserted therein, as indicated in broken lines in Figure 2, aperture 53 being provided for this purpose. When the plug is fully within the jack, its metallic casing 54 bridges the gap between contact 38 and support 52, completing the circuit through heater 45.

In the operation of the voltage regulator, switch contacts 42 and 43 remain in closed position if less than a predetermined low voltage, for example 5 volts, is supplied through the secondary. Under normal conditions, however, it is not expected that the voltage will drop below another predetermined design voltage, for example 7 volts. Therefore, immediately upon insertion of the plug into the jack, the circuit through heater 45 is normally energized and heating of the bimetal element begins. When the bimetal element has been heated sufficiently, flexing results and contact 43 is moved away from contact 42, breaking the circuit and deenergizing heater 45. The bimetal element then cools and moves contact 43 back against contact 42 to reenergize the heater. As long as the voltage remains above the design value, 5 volts, bimetal element 44 continues to make and break contacts 42 and 43 cyclically, as it heats and cools alternately. In this manner the heating energy available to the meter circuit, including heater coil 48 is equivalent to that which would be supplied by a predetermined constant input voltage, regardless of fluctuations in line voltage. Accurate reading at the dial is thereby assured during progressive cooking of the meat.

Of particular importance to the invention is the probe assembly which includes the probe 31, comprising a metallic tube or housing 55, having a tapered metal point or tip 56 of high heat conductivity. The thermistor 57 is mounted in the tube with one side thereof in thermally and electrically conductive contact with the tip 56. An insulated lead 58 is in contact with and extends from the other side of the thermistor through the probe, flexible cable 33, plug 30, and into contact with the metallic tip 59 of the plug, the latter being suitably insulated from the metallic housing thereof, as indicated at 60.

With plug 30 in the jack, as indicated in broken lines in Figure 2, the indicator circuit is completed as follows: from the left hand side of the transformer winding 36, through conductor 41, voltage regulator 27, conductor 47, indicator heater 48, conductor 50, contact 51, tip 59 of the plug, lead 58, thence through the probe assembly to one side of the thermistor 57, from the other side of the thermistor to the metallic probe casing 55, through the outer conductor of flexible cable 33 and the metallic casing 54 of plug 30, to contact 38 in the oven jack, and finally from conductor 39 to the right hand side 37 of the transformer.

In using the apparatus, probe 31 is inserted in the meat to a depth such that point 56 is at the approximate center thereof. This may be done on the top surface of the range by separating plug 30 from the jack. The meat and the probe assembly are then moved into the oven, as shown in Figure 1, and the plug is inserted into the jack thus closing the circuits through heater element 45 of the voltage regulator and through heater 48 of the indicator, as described above. The meat, of course, is still cold and, in view of the high resistance of the thermistor 57, when cold, there will not be enough current flowing through heater 48 to energize the indicator. As the temperature of the meat rises, the resistance of thermistor 57 is lowered and the current increases sufficiently to energize heater 48, which flexes the bimetal element 49 in a manner to move pointer 61 over dial 62. The meat becomes increasingly hot as it approaches its "done" condition, and the pointer is moved progressively through the various positions indicated on the dial. When the pointer indicates that the meat has reached the desired cooked condition, as determined by a glance at the dial, it may be removed from the oven.

The U-shaped bimetal element 49 is self-compensating for variations in ambient temperature, as is known in the art. One end 63 of the bimetal element is anchored while the other end 64 is biased against the pointer, adjacent the pivot point thereof, in such manner that very small movement of the bimetal element will move the outer end of the pointer through a large arc sufficient to traverse the dial.

From the foregoing description it will be understood that this invention provides a cooking tool making it possible for the most inexperienced range user to cook meat to the desired degree and in the most simple and convenient manner. All that is necessary is to insert the probe into the meat and, occasionally, to observe the dial on the control panel.

We claim:

1. A cooking indicator system for a range having an oven, comprising: a source of voltage for said system; a current-responsive indicator; a probe having a temperature sensitive current-controlling element, said probe being insertable in the food to be cooked; a flexible cable and plug assembly connected to said probe; a plural circuit jack adapted to receive the plug; an average-voltage regulating device interposed in a connection between one side of said source and one terminal of said temperature indicator; a connection between the other side of said source and one contact of a first circuit of said jack; a connection between another terminal of said temperature indicator and a second contact of said first circuit of said jack; and connection from second circuit contacts of said jack to said source and said regulating device, the construction and circuitry being such that insertion of said plug into said jack serves to connect said probe in closed circuit with said source, the regulating terminals of said regulating device and said temperature indicator, and serves also to energize said regulating device.

2. A cooking indicator system for a range having an oven, comprising: a line voltage step-down transformer for supplying a relatively low voltage for said system; a current-responsive thermally-actuated temperature indicator mounted exteriorly of said oven; a probe having a temperature sensitive current controlling element therein, said probe being insertable in the food to be cooked; a flexible cable and plug assembly connected to said probe; a plural circuit jack adapted to receive the plug; an average-voltage regulating device interposed in a connection between one side of the secondary winding of said transformer and one terminal of said temperature indicator; a connection between the other side of said secondary winding and one contact of a first circuit of said jack; a connection between another terminal of said temperature indicator and a second contact of said first circuit of said jack; and connections from second circuit contacts of said jack to said source and said regulating device, the construction and circuitry being such that insertion of said plug into said jack serves to connect said probe in closed series circuit with said transformer secondary, said regulating device and said temperature indicator, and simultaneously serves to energize said regulating device.

3. A cooking indicator system for a range having an oven, comprising: a source of voltage for said system; a current-responsive device; a probe having a temperature-sensitive current-controlling element, said probe being insertable in the food to be cooked; a plug member; a plural circuit jack member adapted to receive the plug member; a flexible cable connecting one of said members to said probe; an average-voltage regulating device having energizing and regulating terminals; means including the other one of said members and effective only upon insertion of said plug member in said jack member for connecting said source, said current-responsive device, said current controlling element and regulating terminals of said regulating device in circuit with one another; and means including said other one of said members and effective only upon insertion of said plug member in said jack member for connecting said source and energizing terminals of said regulating device in series with one another, the construction and circuitry being such that insertion of said plug member into said jack member serves to connect said probe in closed circuit with said source, said regulating terminals of said regulating device and said current-responsive device, and serves also to energize said regulating device.

4. A cooking indicator system for a range having an oven, comprising: a source of voltage for said system; a current-responsive device; a probe having a temperature-sensitive current-controlling element, said probe being insertable in the food to be cooked; a plug member; a plural circuit jack member adapted to receive the plug member; a flexible cable connecting one of said members to said probe; an average-voltage regulating device having energizing and regulating terminals; means including the other one of said members and effective only upon insertion of said plug member in said jack member for connecting said source, said current-responsive device, said current controlling element and regulating terminals of said regulating device in series circuit with one another; and means including said other one of said members and effective only upon insertion of said plug member in said jack member for connecting said source and energizing terminals of said regulating device in series with one another, the construction and circuitry being such that insertion of said plug member into said jack member serves to connect said probe in closed series circuit with said source, said regulating terminals of said regulating device and said current-responsive device, and serves also to energize said regulating device.

5. A cooking indicator system for a range having an oven, comprising: a source of voltage for said system; a current-responsive device; a probe having a temperature-sensitive current-controlling element, said probe being insertable in the food to be cooked; a plug member; a plural circuit jack member adapted to receive the plug member; a flexible cable connecting one of said members to said probe; an average-voltage regulating device including a pair of contacts and a coil controlling said contacts; means including the other one of said members and effective only upon insertion of said plug member in said jack member for connecting said source, said current-controlling element and said contacts of said regulating device in circuit with one another; and means including said other one of said members and effective only upon insertion of said plug member in said jack member for connecting said source and said contacts and coil of said regulating device in series with one another, the construction and circuitry being such that insertion of said plug member into said jack members serves to connect said probe in closed circuit with said source, said contacts of said regulating device and said current-responsive device, and serves also to energize said coil of said regulating device.

6. A cooking indicator system for a range having an oven, comprising: a source of voltage for said system; a current-responsive device; a probe having a temperature-sensitive current-controlling element, said probe being insertable in the food to be cooked; a plug member; a plural circuit jack member adapted to receive the plug member; a flexible cable connecting one of said members to said probe; an average-voltage regulating device including a pair of contacts and a coil controlling said contacts; means including the other one of said members and effective only upon insertion of said plug member in said jack member for connecting said source, said current-controlling element and said contacts of said regulating device in series circuit with one another; and means including said other one of said members and effective only upon insertion of said plug member in said jack member for connecting said source and said contacts and coil of said regulating device in series with one another, the construction and circuitry being such that insertion of said plug member into said jack member serves to connect said probe in closed series circuit with said source, said contacts of said regulating device and said current-responsive device, and serves also to energize said coil of said regulating device.

References Cited in the file of this patent

UNITED STATES PATENTS

| | | |
|---|---|---|
| 2,510,526 | Smith | June 6, 1950 |
| 2,587,384 | Roberts | Feb. 26, 1952 |
| 2,615,085 | Smulski | Oct. 21, 1952 |
| 2,657,580 | Schroeder | Nov. 3, 1953 |